Nov. 13, 1934.  T. BROWN  1,980,470
CULTIVATOR
Filed May 20, 1933   8 Sheets-Sheet 1
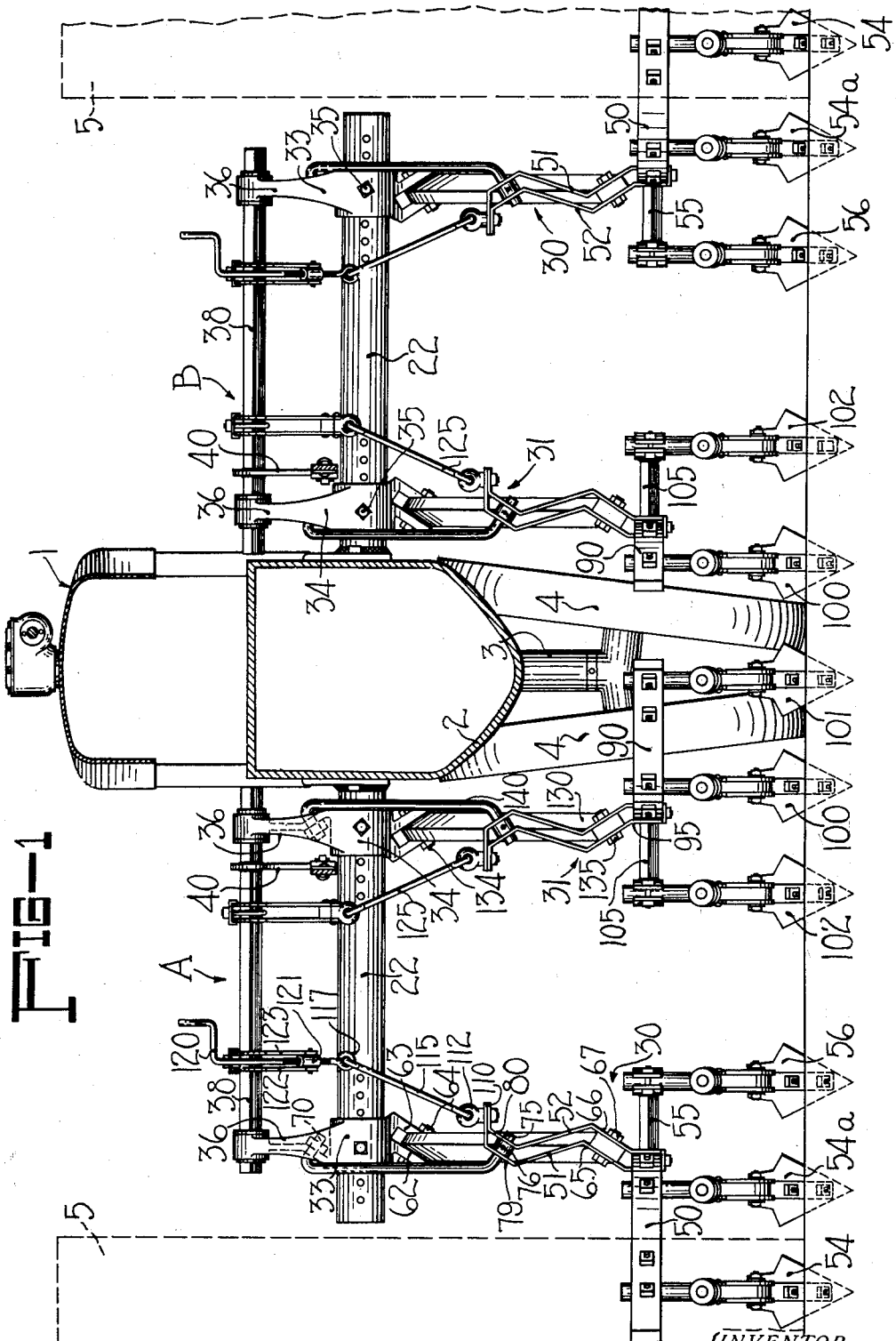
INVENTOR
Theophilus Brown
BY Brown, Jackson, Boettcher & Diemer
ATTORNEYS.

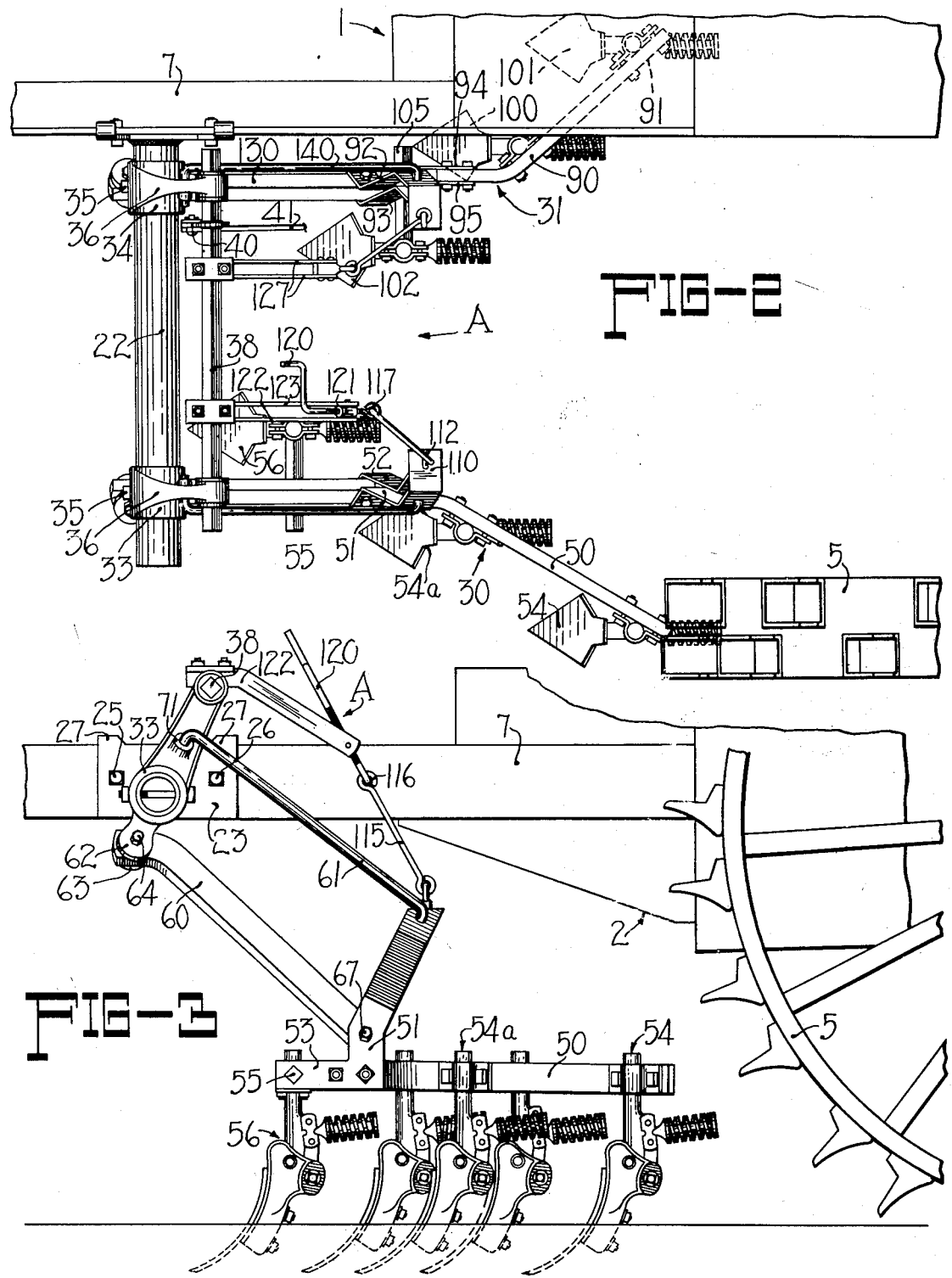

Nov. 13, 1934.  T. BROWN  1,980,470
CULTIVATOR
Filed May 20, 1933  8 Sheets-Sheet 3
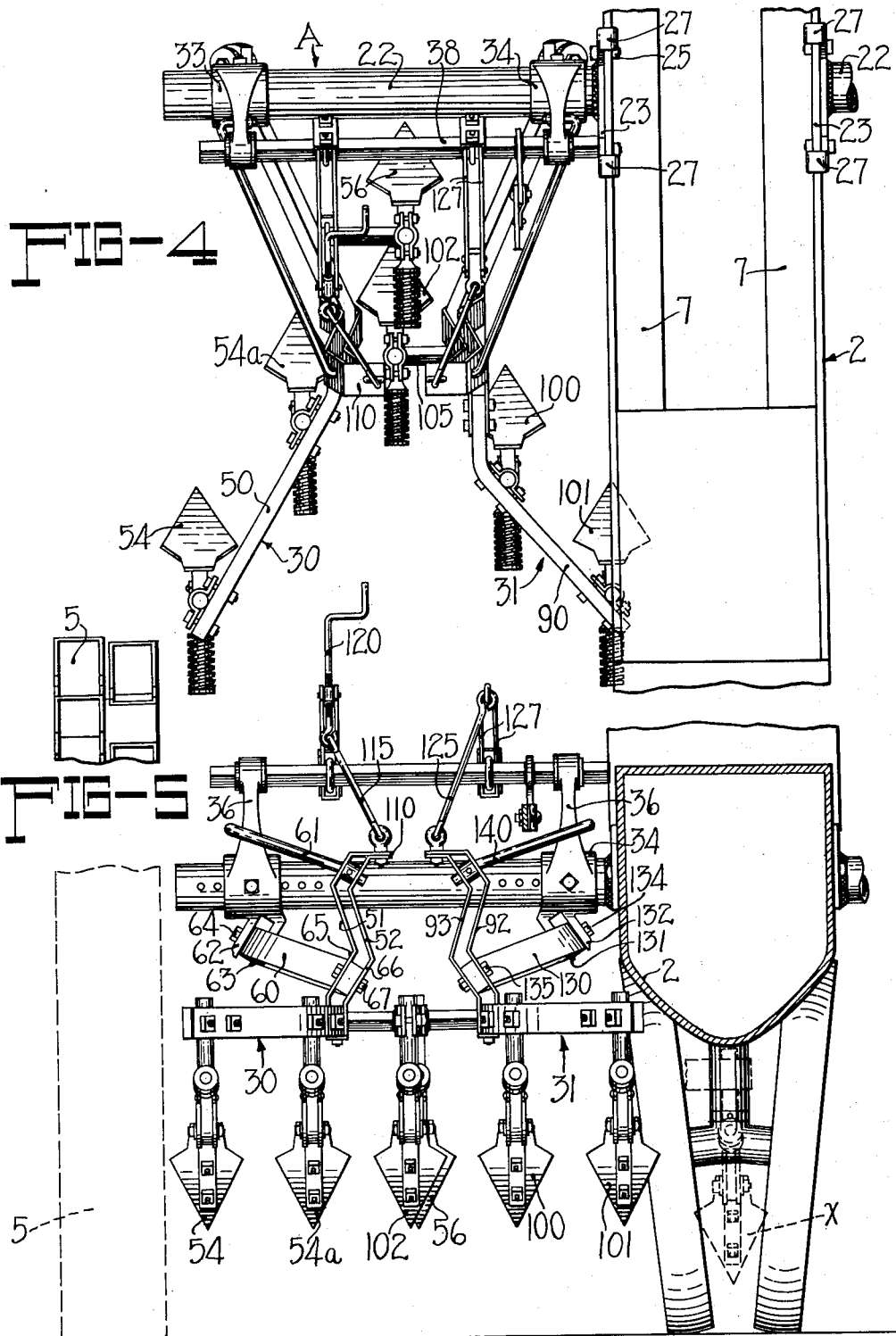
INVENTOR
Theophilus Brown
BY Brown, Jackson, Boettcher & Diemer
ATTORNEYS.

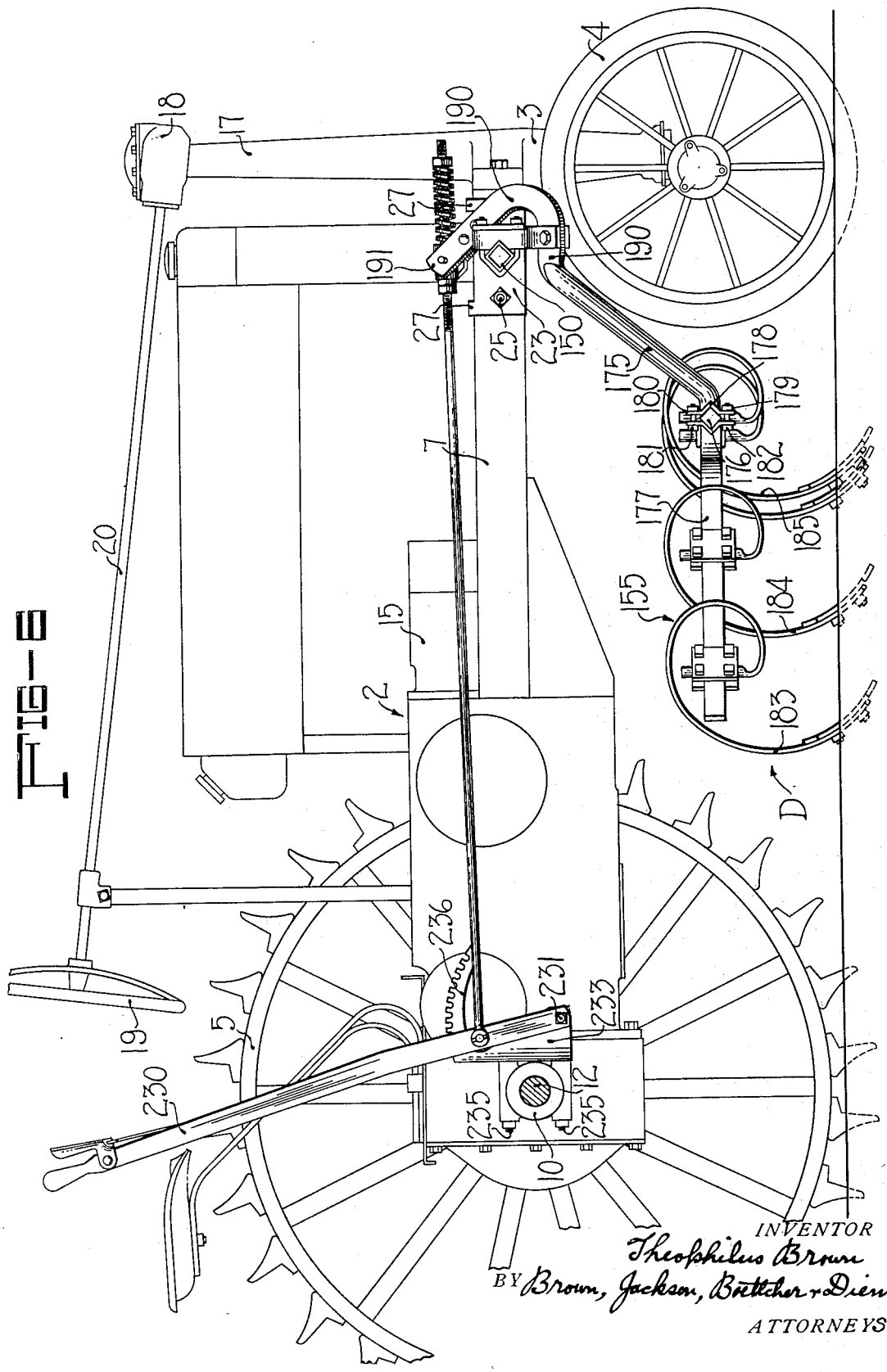

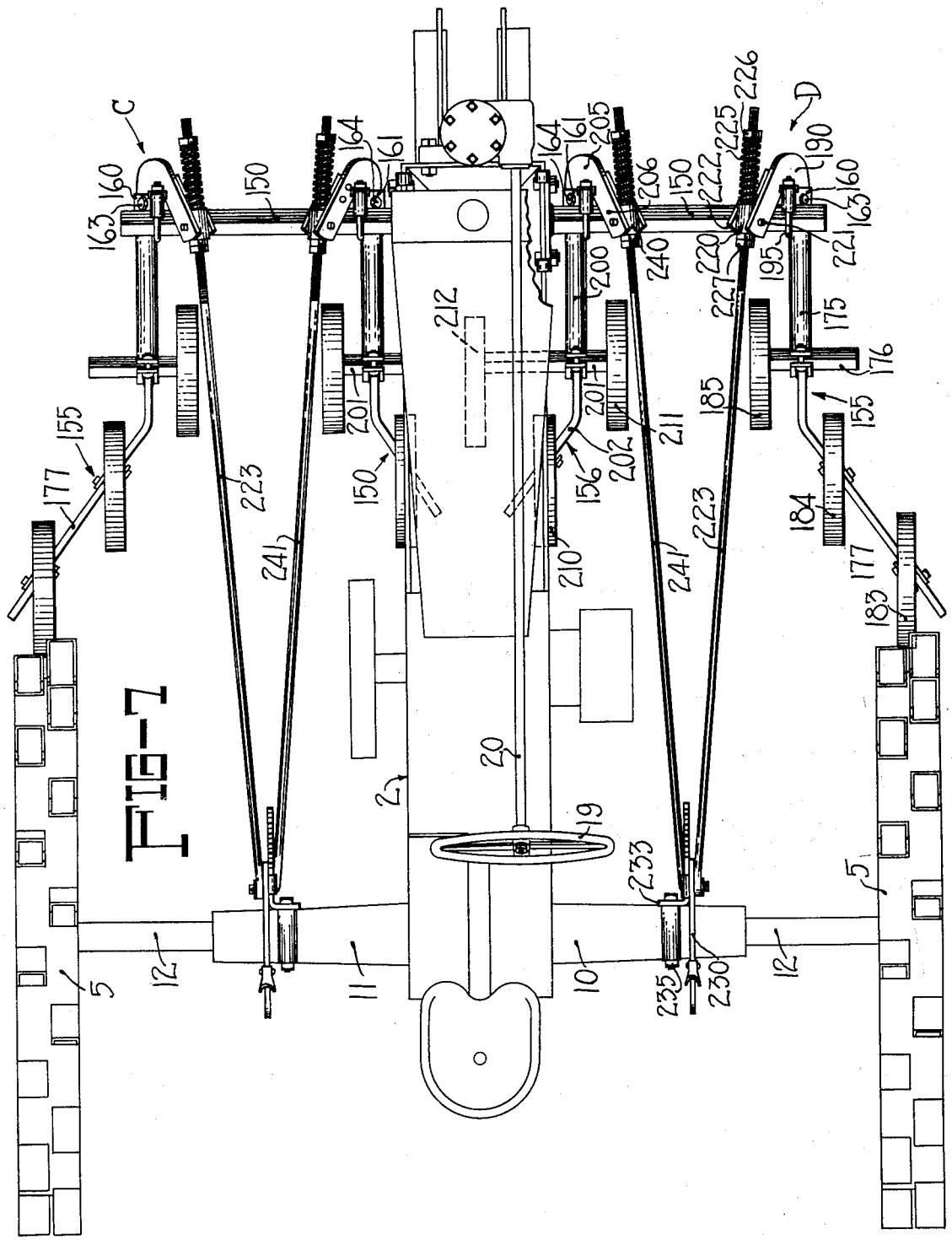

Nov. 13, 1934.     T. BROWN     1,980,470
CULTIVATOR
Filed May 20, 1933     8 Sheets-Sheet 6
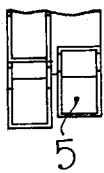
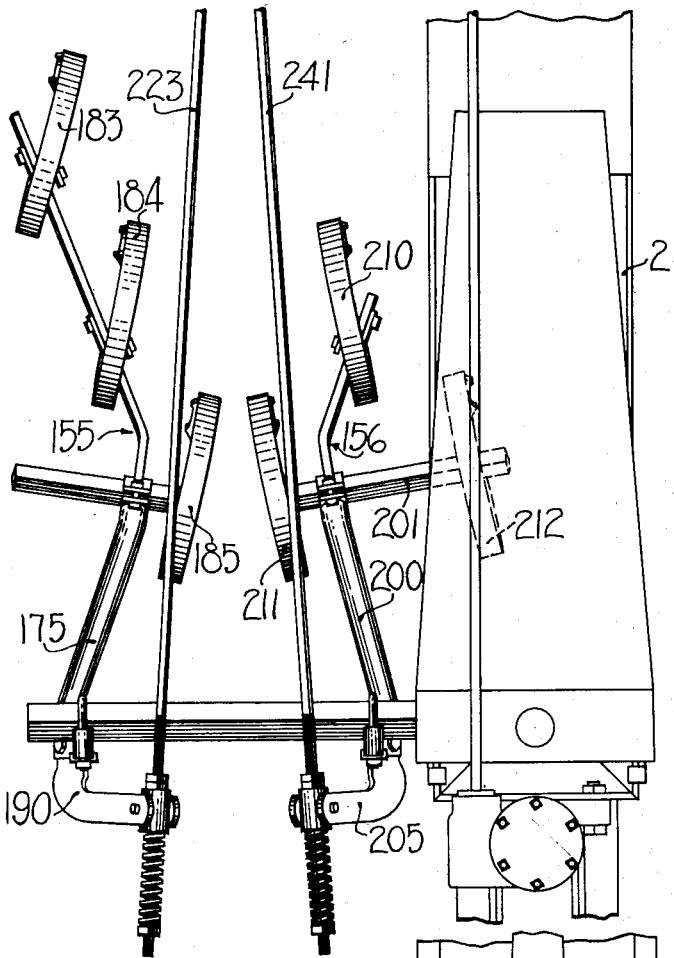
FIG-8
FIG-9
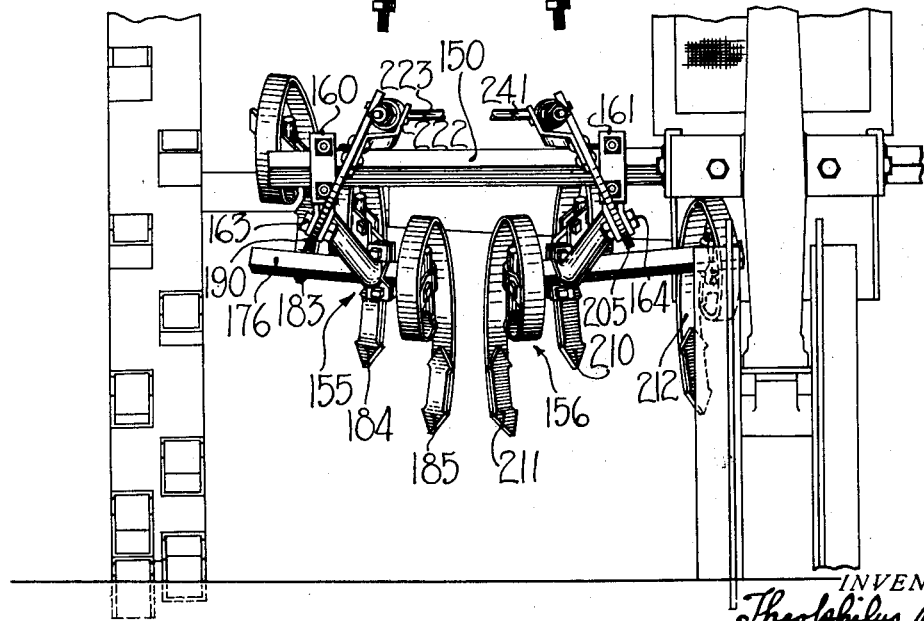
INVENTOR
Theophilus Brown
BY Brown, Jackson, Boettcher & Diemer
ATTORNEYS.

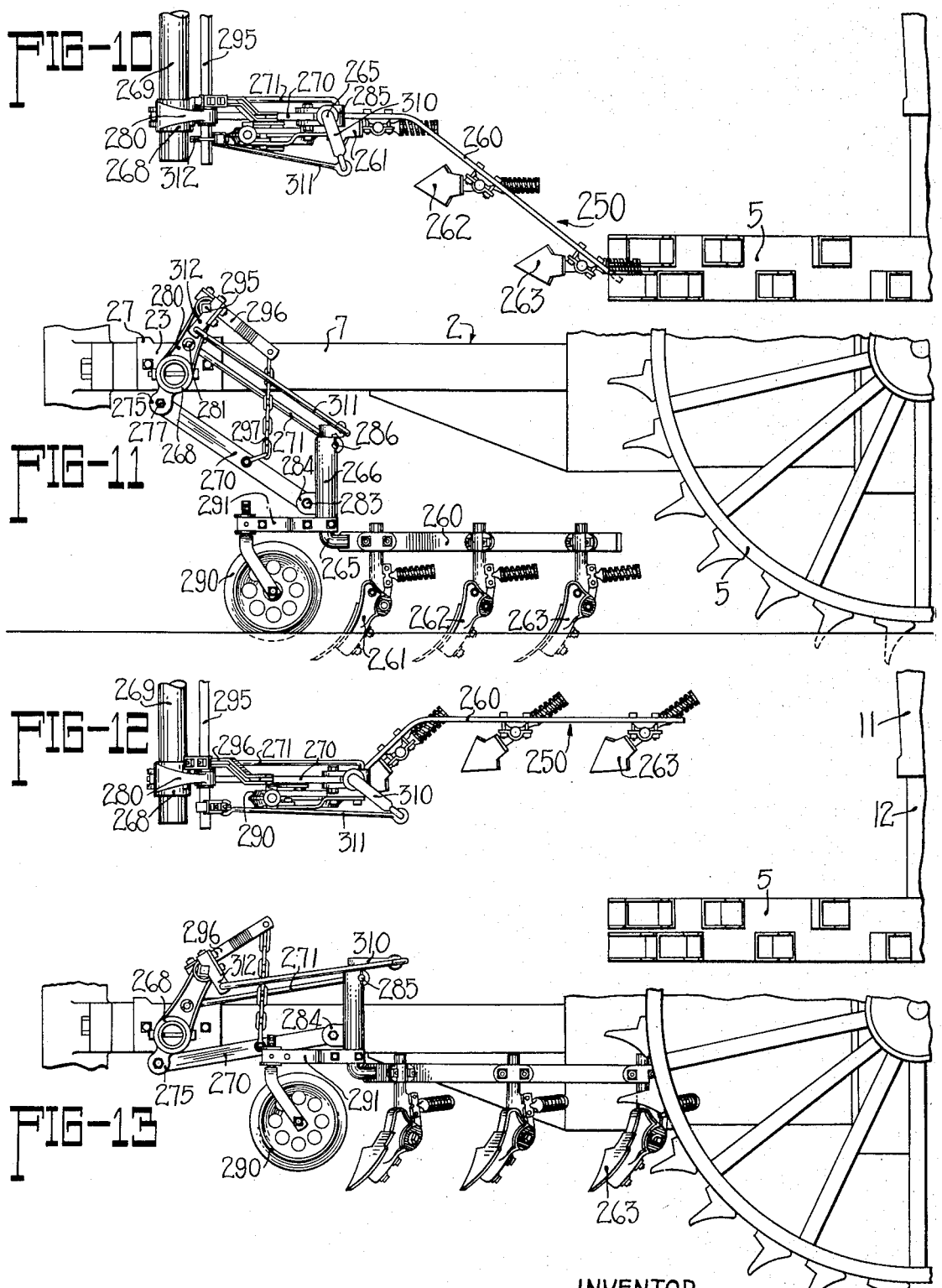

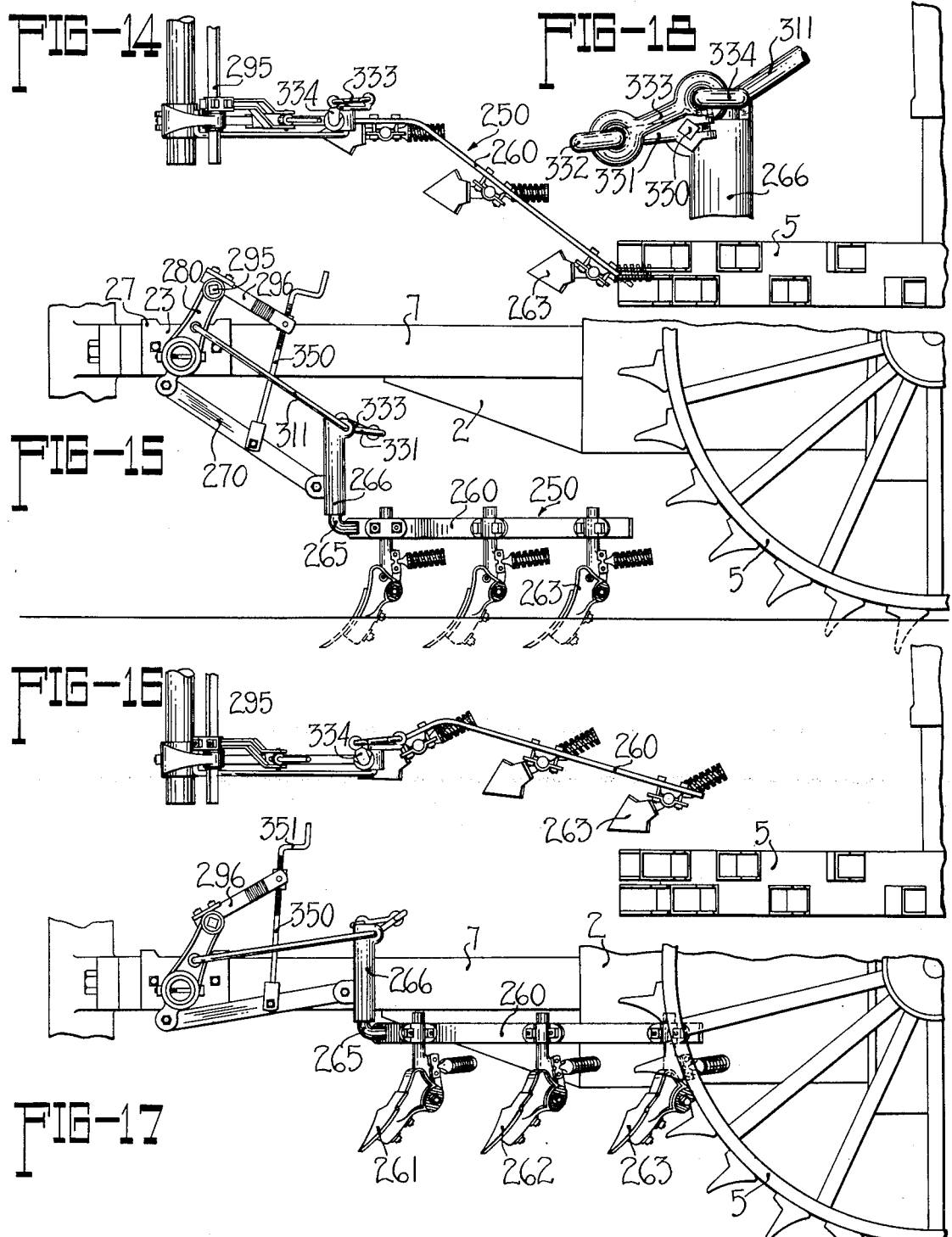

Patented Nov. 13, 1934

1,980,470

UNITED STATES PATENT OFFICE 1,980,470

CULTIVATOR

Theophilus Brown, Moline, Ill., assignor to Deere & Company, Moline, Ill., a corporation of Illinois Application May 20, 1933, Serial No. 672,002

23 Claims. (Cl. 97—47)

The present invention relates generally to cultivators and has for its principal purpose the provision of a cultivating implement in the nature of an attachment adapted to be detachably connected with relatively small tractors, such as those of the type adapted to pull a single bottom plow and which have a relatively short wheel base and are relatively low with respect to the ground.

In some cases it has been found that when an attempt is made to attach more or less standard cultivators to the small type of farm tractor, in which the body of the tractor is somewhat lower than in the usual type of tractor, the proper amount of lift is not obtainable for the center rig. It was also found that, because of the short wheel base employed in small farm tractors, interference frequently occurs between the rear cultivating tools and the traction wheels. The present invention is therefore principally concerned with the provision of a cultivator wherein these objectionable features are avoided.

Another object of the present invention is the provision of improved connections between the soil engaging or tilling units and the tractor wherein when the soil engaging units are raised they are caused to move away from adjacent parts of the tractor so as to avoid striking them or otherwise interfering with the proper operation thereof when the soil engaging units are raised to an inoperative position.

Further, another object of the present invention is the provision of means providing for the connection of the soil tilling units with the tractor for swinging movement about transversely extending inclined axes, whereby when the units are raised to an inoperative position by swinging them upwardly about said axes, the units move away from both the traction wheels and the body of the tractor into the open space therebetween, thus providing for sufficient lift of the soil engaging tools.

More specifically, the present invention contemplates the provision of cultivating units, each including a pair of tool beams so connected with the tractor that when the beams are raised to their inoperative position the laterally outer tool beam is swung inwardly away from the adjacent traction wheel and the laterally inner tool beam is swung outwardly away from the body of the tractor. The present invention contemplates securing this desirable result in several ways, as by inclining the pivotal axis with which said beams are connected with the tractor, for example, or by providing such connections whereby the tool beams have both vertical swinging movement and lateral swinging movement or a combination of such movements.

Still further, another object of the present invention is the provision of a cultivating attachment for tractors and the like in which the tool beams have the above mentioned characteristics but which are so connected with the tractor that depth adjustments for the tool beams do not cause any material lateral variation in the position of the tools so long as they are in their working or operative position.

An additional object of the present invention is the provision of a cultivating attachment for small short coupled tractors wherein the soil engaging or tilling units are connected with the tractor in draft transmitting relation between the front and rear wheels, the tools proper being disposed closely adjacent the rear wheels of the tractor and hence under the close observation of the operator.

These and other objects and advantages of the present invention will be apparent to those skilled in the art after a consideration of the following detailed description of preferred constructions, taken in conjunction with the accompanying drawings illustrating such constructions.

In the drawings:

Figure 1 is a view taken transversely through the tractor and looking forwardly, the cultivator units appearing in elevation and the position of the rear traction wheels of the tractor being indicated in dotted lines;

Figure 2 is a fragmentary top plan view, looking downwardly on the left hand cultivator unit of Figure 1;

Figure 3 is a side elevation of the cultivator unit shown in Figure 2;

Figure 4 is a top plan view similar to Figure 2 but showing the cultivator unit in raised or inoperative position;

Figure 5 is a view of the left hand cultivator unit shown in Figure 1 but illustrating the position of the parts when the cultivating means have been raised to inoperative position;

Figure 6 is a side elevation of a modified form of cultivating means of somewhat simplified construction;

Figure 7 is a top plan view of the cultivator shown in Figure 6;

Figure 8 is a top plan view of the right hand unit of the cultivator shown in Figure 7 but showing the same in non-working or in inoperative position;

Figure 9 is an end elevation looking rearwardly of the unit shown in Figure 8;

Figures 10 and 11 are, respectively, a top plan view and a side elevation of a third modified form of cultivator unit, Figures 10 and 11 showing only the left hand outer rig;

Figures 12 and 13 are, respectively, a top plan view and a side elevation of the unit shown in Figures 10 and 11, illustrating the same in its inoperative or transport position;

Figures 14 to 17 are views similar to Figures 10 to 13 but showing another modified form of the present invention; and Figure 18 is a fragmentary detail view on an enlarged scale showing a portion of the means provided for swinging the tool beams laterally as they are raised.

Referring now more particularly to Figures 1 to 5, inclusive, the form of the invention illustrated in these figures comprises two substantially identical units A and B, one mounted on each side of the tractor 1, which constitutes or serves as a wheeled supporting frame for the cultivator units. The tractor 1 comprises a body portion 2 disposed fairly close to the ground and supported from a steering truck 3, including front wheels 4, and rear traction wheels 5. The body 2 of the tractor also includes longitudinally disposed frame members 7 constituting side rails of the tractor frame. As somewhat more clearly shown in Figure 7, the tractor body 2 includes laterally extending axle housings 10 and 11 in which are journaled axles 12 to which the traction wheels 5 of the tractor are connected. The tractor is powered by a motor 15 or the equivalent, and the steering truck 3 is controlled through suitable mechanism disposed in a steering column 17 having at its upper end a gear box 18 in which suitable reduction gearing is disposed. The tractor is steered by the usual hand wheel 19 connected with the reduction gear by means of a shaft 20.

Each of the cultivator units A and B comprises a laterally extending beam or draft bar 22 fixed at its inner end to a plate 23 bolted to the side rail 7 of the tractor by means of bolts 25 and 26, as best shown in Figure 3. Preferably, the inner end of the draft beam 22 is welded or otherwise fixedly secured to the plate 23, and the plate 23 is provided at its upper corners with inwardly and downwardly bent lug portions 27 adapted to hook over the associated side rail of the tractor to further support the draft beam 22. This manner of attaching the cultivator units A and B does not form a part of the present invention, being the invention of Theodore W. Johnson, and disclosed and claimed in an application filed by him on October 1, 1934, Serial No. 746,281.

Each of the draft bars or beams 22 carries one outer cultivator rig 30 and one inner cultivator rig 31, the rigs being supported from the draft beam 22 by means of castings 33 and 34 adjustably fixed thereto by bolts 35 or the equivalent. Each of these castings is provided with an upwardly extending arm 36, these arms having bearings formed at their upper ends in which a lifting rock shaft 38 is journaled. The rock shaft 38 is provided with an arm 40 fixed thereto, and to the end of this arm lifting means 41, either power operated or manually operated, may be connected in any suitable manner.

The cultivator units A and B are substantially identical with the exception that one is mounted on one side of the tractor 1, while the other is mounted on the other side thereof. Each cultivator unit includes an outer cultivator rig 30 and an inner cultivator rig 31, as referred to above.

Each of the outer cultivator rigs comprises a beam 50 bent to suitable form, as indicated in Figure 2, and having its front end clamped between L-shaped plates 51 and 52 having forwardly extending leg portions 53, as indicated in Figure 3. The rig beam 50 is extended rearwardly and laterally outwardly, and carries two shovels 54 and 54a. The forwardly extending leg portions 53 of the plates 51 and 52 are suitably apertured to receive a cross bar 55 which extends transversely and is adjustably supported by the plates 51 and 52. The laterally inner end of the transverse cross bar 55 is provided with an inner or forward shovel 56. It is to be noted that the rear shovel 54 for the left hand cultivator unit in its lowered or working position is disposed substantially in the plane of and closely adjacent to the left hand rear traction wheel and substantially in the general plane thereof, while the front shovel 56 is disposed laterally inwardly of this plane and substantially directly underneath the rock shaft 38. The right hand unit is arranged in the same way.

The outer rig 30 of the left hand cultivator unit A is supported from the casing member 33 by means of a pair of substantially parallel links 60 and 61 whereby the left rig beam 50 occupies successive parallel positions in its vertical movements. The lower parallel link 60 is pivotally supported at its upper end between a pair of downwardly and outwardly inclined lugs 62 and 63, best shown in Figures 1, 3 and 5, on a downwardly and inwardly inclined pivot bolt 64 supported by the lugs 62 and 63. At its lower end the link 60 is pivotally connected between the inwardly and upwardly bent portions 65 and 66 of the plates 51 and 52 on a downwardly and inwardly inclined pivot bolt 67 disposed in parallelism with respect to the pivot bolt 64.

The upper end of the upper parallel link 61 is bent at an acute angle with respect to the main body portion thereof, as best shown in Figure 1, the bent portion 70 being journaled in bearing openings provided in a boss or bosses 71 formed on the supporting casting 33. The axis defined by these bearing openings is inclined downwardly and inwardly in parallelism with respect to the axes defined by the pivot bolts 64 and 67. The lower end of the link 61 is provided with a bent portion 75 which is journaled in a bearing 76 fixed between the upwardly and inwardly bent portions 79 and 80 of the plate members 51 and 52, the axis of the bearing member 76 being also inclined downwardly and inwardly in parallelism with the pivot bolts 64 and 67 and the bearing openings in the bearing boss 71 of the casting member 33.

Since the axes of the pivots at both ends of the links 60 and 61 are of the same inclination and are parallel to each other, as the rig 50 is raised or lowered it is caused to move bodily in a plane perpendicular to these axes, this plane being inclined upwardly and inwardly with respect to the tractor 1. The path of movement, therefore, of the rig 50 during the raising and lowering operation lies in this plane. The rig 50 is shown in its lowered position in Figures 1, 2 and 3, and in its raised position in Figures 4 and 5. By comparing Figures 1 and 5, it will be observed that as the rig 50 is raised from the position shown in Figure 1 to the position as shown in Figure 5, the rear and outermost tool 54 moves from a position directly in front of the left hand traction wheel 5 to a position at one side thereof and between the traction wheel and the body 2 of the tractor. Also, by comparing Figure 2 with Figure 4, it will be observed that the laterally inward movement of the rig 50 is somewhat greater than its longitudinal displacement.

The inner cultivator rig 31 of the unit A is substantially identical, for all practical purposes, with the rig construction just described, except that the rear end of the rig beam is disposed laterally inwardly instead of laterally outwardly, and the supporting means for the inner rig beam is arranged to cause the beam to move in a plane which extends upwardly and outwardly with respect to the tractor in converging relation with respect to the plane or path of movement of the outer rig 30.

The inner rig beam is indicated by the reference numeral 90 and has its rear end 91, see Figure 2, bent laterally and inwardly with respect to the tractor 1 and to its forward end is fixed two shovels 100 and 101, the former being partly underneath the tractor body 2 and the latter being directly underneath the center of the body 2, as best shown in Figure 1. A front shovel 102 is carried by the inner end of a transverse or cross bar 105 adjustably supported in perforations in the rearwardly extending legs 94 and 95 of the plates 92 and 93. As will be clear from Figure 2, the cross bar 105 is disposed forwardly of the forward end of the rig beam 90 but is in a rearward position with respect to the outer cross bar 55, thereby preventing interference between these two shovels when the two rigs 30 and 31 are raised into the position indicated in Figures 4 and 5. From the latter figure it will be observed that the front shovel 102 assumes a position directly in rear of the front shovel 56 of the outer rig 30.

Both the rig 30 and the rig 31 are raised and lowered by virtue of suitable connections with the lifting rock shaft 38. In the case of the outer cultivator rig 30, the upper ends of the plates 51 and 52 are bent laterally, as at 110, to receive a swivel eye 112 carried by the laterally bent ends 110 and receiving the lower eye of a link 115, the upper end of which is formed with an eye 116 connected with an eye 117 formed on the lower end of a crank screw 120 threaded into a nut 121 rockably supported between a pair of arms 122 and 123 fixed at their forward ends to the rock shaft 38.

The inner rig beam 90 is connected in substantially the same manner, a link 125 being connected at its lower end with the outwardly bent ends of the plates 92 and 93 and at its upper end with a pair of arms 127. In this case the provision of a crank screw similar to that shown in Figure 3 at 120 is not necessary, since it is the object of the crank screw 120 to adjust the position of the outer rig 50 with respect to the inner rig 90.

The inner rig 31 is connected with the casting member 34 by a system of parallel links similar to the links 60 and 61 described above for the outer unit 30. In this case the lower link is indicated by the reference numeral 130 and is pivotally connected with downwardly and inwardly inclined lugs 131 and 132 on the casting 34 and with the portions of the plates 92 and 93 which are parallel to the lugs 131 and 132 by pivot bolts 134 and 135 which define parallel axes which extend downwardly and outwardly with respect to the tractor and correspond to the axes defined by the pivot bolts 64 and 67 for the outer rig. Similarly, the upper link 140 is pivotally connected with the arm 36 of the inner casting 34 and with the upper portions of the plate 92 and 93 for pivotal movement about axes which are parallel with respect to and the same distance apart as the axes defined by the pivot bolts for the lower link 130.

The cultivator unit B at the other side of the tractor, see Figure 1, is practically identical with the cultivator unit A described above so that no further description for the cultivator unit B is necessary. It is to be noted that the same reference numerals have been applied.

Reference has been made above to the fact that when the cultivator units are raised, the outer cultivator rigs move upwardly and laterally inwardly with respect to the tractor, while the inner cultivator rigs move upwardly and laterally outwardly with respect to the tractor. This means that the outer cultivator rigs move inwardly from the traction wheel 5 adjacent which they are disposed and behind which the outermost cultivator shovel 54 is disposed, while the laterally inner rigs 31 move upwardly and outwardly and away from the body 2 of the tractor. This relation is illustrated in Figure 5 which shows the left hand cultivator rigs 30 and 31 in their raised position. Due to the fact that the inner rigs are moved outwardly with respect to the tractor as they are raised, they do not come into contact with the under side of the tractor body 2. If, for example, the inner rig 31 shown in Figure 5 were lifted directly vertically it could not be lifted beyond the position shown in dotted lines at $x$ in Figure 5 because the upper end of the tool shank would come into contact with the under side of the tractor body 2. While in this position the innermost cultivator shovel 101 would be raised above the ground, it would not provide sufficient clearance for all operating conditions. As shown in Figure 5, by reason of the outer rig being moved inwardly as it is raised, in a full raised position, the outer end of the rig is brought into a plane inside of the inner plane of the rear traction wheel where it cannot come into contact with the wheels of the lugs or any soil adhering thereto.

In cultivators having the characteristics described above, namely, where the rigs are raised along upwardly and inwardly converging paths of movement, when the rigs are lowered to increase the depth of cultivation, they are at the same time moved farther away from the plants. Under many conditions this is a particularly desirable feature because the deeper the shovels operate the more loose soil they throw up, and to prevent the plants from being covered up by such soil the shovels should be set farther apart with respect to the plant row. This is especially important in cultivating short young plants.

Figures 6 to 9 illustrate an embodiment of the present invention which is somewhat simpler than the construction illustrated in Figures 1 to 5. In certain cases it will be desirable to omit the feature of having the cultivator rigs move vertically in successively parallel positions by virtue of a system of parallel links by which the rigs are connected with the tractor, and in such cases where these features are omitted, the cultivator rigs may be directly connected with the tractor by means of a single pivot. Figures 6 to 9 also show the use of a different form of shovel than is utilized in Figures 1 to 5, but it is to be understood, of course, that various tools may be used as desired. Specifically, the shovels shown in Figures 6 to 9 are of the spring tooth type, while the shovels illustrated in Figures 1 to 5 are of the spring type. Obviously, of course, other forms of shovels or other tools may be used if desired.

As illustrated in Figures 6 to 9, the cultivator of the present invention includes two substantially identical units C and D, one mounted on each side of the tractor 2. Each of the units C and D comprises a laterally extending draft bar or beam 150, in this case the beam being made of pipe stock of square cross section. The inner ends of the draft bars 150 are detachably connected with the side rails 7 of the tractor in a manner similar to that shown in the construction illustrated in Figures 1 to 5, namely, by means of a plate 23 to which the inner end of the associated draft bar 150 is secured, as by welding, or the like, the plate 23 being provided with bolts 25 and lugs 27 as described above.

Each of the draft beams 150 carries an outer rig 155 and an inner rig 156 supported from the associated draft beam by means of brackets 160 and 161 for movement relative thereto about inclined pivot axes defined by pivot bolts 163 and 164. As best shown in Figure 7, the pivot bolts 163 and 164 extend, respectively, laterally inwardly and downwardly and laterally outwardly and downwardly with respect to the tractor.

Each laterally outer rig 155 comprises an upwardly bent member 175, a transverse member 176 and a laterally and rearwardly bent member 177. The lower end of the member 175 is formed with a V-shaped socket 178 and two vertically extending lugs 179 and 180 forged or otherwise formed thereon, and the forward end of the member 177 is formed with a similar or complementary socket and lug. When these parts are brought together, as shown in Figure 6, and clamped together, as by bolts 181 and 182, a square recess is provided for the reception of the transverse member 176 which is also square. When the bolts 181 and 182 are tightened, the transverse member 176 is securely clamped between the members 175 and 177. The latter member is in the form of a tool beam and is arranged to carry two spring shovels 183 and 184, and on the inner end of the transverse member 176 a third spring shovel 185 is mounted, as best shown in Figure 7.

The upper end of each of the members 175 is flattened, as at 190, and, as best shown in Figure 9, the plane in which the flattened end lies extends downwardly and outwardly with respect to the tractor. The flattened end is pivotally connected to the bracket by means of the pivot bolt 163. The flattened end 190 is extended upwardly and then rearwardly, as indicated at 191 in Figure 6, and this end is connected with depth adjusting means later to be described in detail. The bracket 160 which supports the outer rig 155 is capable of lateral adjustment on the draft bar 150 and, further, the bracket 160 carries a U-bolt by which it is secured to the bar 150. By loosening the U-bolt, the bracket 160 may be adjusted laterally on the bar 150 to any desired position.

The inner rig 156 is of practically the same construction as the outer rig 155. The inner rig 156 comprises an upwardly bent member 200, a transverse member 201 and a laterally and inwardly extending member in the form of a tool beam 202, corresponding, respectively, to the members 175, 176 and 177 forming the outer cultivator rig 155. The forwardmost end of the upwardly extending member 200 is flattened, as at 205, and includes an upwardly and rearwardly extending portion 206 to which depth adjusting means or raising means may be secured as will be described later. The portion 205 is flattened, similarly to the portion 190 described above, and is pivotally connected with the inner bracket 161 by means of the pivot bolt 164. This disposes the flattened portion 205 in a plane which is upwardly and outwardly inclined with respect to the tractor. The tool beam 202 carries an intermediate shovel 210 and the transverse member 201 carries an outer shovel 211 and an inner shovel 212, the latter being disposed substantially centrally of the tractor, as indicated in dotted lines in Figure 7.

As mentioned above, lifting connections are provided for the cultivator rigs 155 and 156. These lifting connections are substantially identical. The lifting connection for the outer rig 155 comprises a sleeve 220 provided with laterally extending trunnions 221 which are pivoted in perforations in the upper end of the flattened arm portion 190 of the rig member 175 and in a strap 222 carried by the upper end of the arm 190. A pull rod 223 extends through the sleeve 220 and is threaded at its forward end. A spring 225 is mounted on the threaded end of the pull rod 223 forward of the sleeve 220 and is mounted between this sleeve and a nut 226 threaded onto the forward end of the rod. At the rear of the sleeve 220 the pull rod 223 is provided with adjusting nuts 227. Through this connection with the arm 190, a pull on the rod 223 will place the rig 155 into a working position with a yielding pressure, established by virtue of the spring 225. Moving the rod 223 forwardly will cause the nuts 227 to engage the sleeve 220, whereby the rig may be lifted into an inoperative position. The rear end of the pull rod 223 is pivotally connected with a lifting lever 230, the latter being pivotally connected, as best shown in Figure 6, at 231 with a bracket 233 fixed to the rear axle housing 10 of the tractor. The bracket 230 is connected with the housing 10 by means of bolts 235 or the equivalent, and the upper portion of the bracket 231 is formed to provide a notched sector 236 for the detent means of the lever 230.

The inner rig 156 is provided with lifting connections which are identical, for all practical purposes, with the pull rod 223 and associated parts just described. Looking at Figure 7, it will be seen that the upper end 206 of the rig member 200 is provided with a sleeve 240 pivotally connected therewith and receiving the forward threaded end of a pull rod 241, the rear end of which is connected with the lifting lever 230, preferably at the same pivot point. Thus, the operation of the single lever 230 will raise and lower both the outer cultivator rig 155 and the inner cultivator rig 156.

As will be clear from Figure 9, due to the downward and inward inclination of the pivot 163 and the downward and outward inclination of the pivot 164, when the lifting lever 230 is moved forwardly to raise the rigs 155 and 156, these rigs are moved upwardly in planes or paths which converge upwardly. This causes the outer rig 155 to swing upwardly and inwardly and away from the wheel 5, as will be obvious by comparing Figures 7 and 8, and the inner rig 156 will be caused to move upwardly and laterally outwardly from the position shown in Figure 7 to the position shown in Figure 8. In this way the outer rear shovel 183 will be brought inside of the inner plane of the rear traction wheel 5 of the tractor to a position where it will not interfere with the lugs thereon, and similarly the intermediate shovel 210 on the inner rig will be brought upwardly and outwardly and into the space between the body 2 of the tractor and the traction wheel and out from under the body 2.

With respect to the innermost shovel 212, this tool is not swung laterally sufficiently to clear the tractor body, but due to the fact that this tool is disposed well forward of the tractor, namely, on the transverse bar 201, and due to the fact that there is a substantial amount of clearance at the forward portion of the tractor body at this point, the inner cultivator rig 156 can be raised high enough to provide sufficient clearance, as will be clear from Figure 9.

The rigs on the opposite side of the tractor are similar to those described above except that the transverse member 201 for the left hand inner rig 156 carries only one shovel, it not being necessary for both inside rigs to carry a center shovel 212.

In the two forms of the invention described above, the desired lateral movement of the cultivator rigs, the outer rigs moving laterally inwardly and the inner rigs moving laterally outwardly, is obtained by pivotally connecting the rigs with the tractor or with the transverse draft beam, for movement about inclined pivot axes. Another form of the invention is shown in Figures 10 to 13, and in this form the lateral movement of the rigs is obtained by connecting the rig beams to a vertical spindle journaled in a sleeve which is supported from the tractor through a pair of parallel links or the equivalent and by providing means for causing the spindle to rotate in the sleeve when that rig and its sleeve are raised to a lifted position. Means are provided for swinging the outer rigs inwardly to clear the traction wheels and to swing the inner rigs outwardly to clear the body of the tractor, this swinging movement of the rigs being controlled by means of a link connected with the lifting rock shaft and with the spindle. Preferably, the connecting link is of the same length and is positioned parallel with respect to the parallel links supporting the sleeve from the tractor. As a result of this arrangement, the position of the rig in its sleeve is not affected by the rise and fall of the rig in passing over uneven ground.

Referring now more particularly to Figures 10 to 13, the outer left hand rig of a two-row cultivator mounted on a tractor has been shown, and this rig has been indicated in its entirety by the reference numeral 250. The cultivator rig shown comprises a rig beam 260 which supports three shovels 261, 262 and 263, the tool beam 260 being bent laterally and outwardly to position the rear shovel 263 in front of and in line with the left hand traction wheel 5 of the tractor. When the tractor is of the short coupled type, this positioning disposes the rear shovel 263 closely underneath the traction wheel 5, as indicated in Figures 10 and 11.

The front end of the tool beam 260 is fixed to a vertical spindle 265 which is journaled in a vertically disposed sleeve 266. This sleeve is pivotally connected with a casting member 268 by means of parallel links 270 and 271. The casting 268 is suitably fixed to a laterally extending draft beam 269 connected with the tractor body 2 or the side rails 7 thereof in any manner desired, preferably by the plate and lug means 23 and 27 described above.

The casing member 268 carries lower lugs 275 between which the upper end of the lower parallel link 270 is pivoted, as by a pivot bolt 277. The casting member 268 is also provided with an upwardly extending arm 280 provided with a boss in which the upper end 281 of the other parallel link 271 is pivotally disposed. The rear end of the lower parallel link 270 is pivotally connected, as by a pivot bolt 283, between a pair of lugs 284 carried by the lower portion of the sleeve 266, and the upper portion of this sleeve member carries a boss or lug 285 suitably apertured to receive the laterally bent end 286 of the upper parallel link 271.

The depth at which the shovels 261, 262 and 263 operate is controlled by a castering gauge wheel 290 which is supported in a vertical bearing carried at the forward end of an arm 291 fixed to the lower end of the sleeve 266.

The rig 250 is raised to an inoperative position by means of a lifting rock shaft 295 journaled in suitable bearings carried by the arms 280 and provided with an arm 296 which is connected with the lower parallel link 270 by means of a chain 297. The draft bar 269 and the lifting rock shaft 295, as well as the casting member 268, are identical, for all practical purposes, with the draft bar 22 shown in Figures 1 to 5 and the associated parts. Like the rock shaft 38 shown in Figure 1, the rock shaft 295 is supported in the arm 280 of the casting member 268 and in the corresponding arm of a similar casting for the companion inner rig (not shown). The chain 297 is normally provided with some slack so that the rig 250 is free to rise and fall within limits relative to the tractor to follow the contour of the ground surface.

In order to provide for swinging the cultivator rig 250 laterally inwardly the upper end of the spindle 265 is formed with or has secured thereto a laterally extending arm 310 connected by a link 311 with an arm 312 fixedly secured to the rock shaft 295. The arms 310 and 312 are so spaced that the link 311 extends parallel with the links 270 and 271 and is of substantially the same length. As a result of this construction, as the cultivator rig 250 shifts vertically to correspond with variations in the ground surface and as long as the rock shaft 295 remains in fixed position, the lateral position of the cultivator rig 250 does not change. This relationship is illustrated in Figures 10 and 11, wherein it will be observed that the rig 250 is in working position and the links 270, 271 and 311 are disposed in parallelism. The cultivator rig 250 is therefore held in fixed lateral position as it rises and falls under the control of the ground engaging caster wheel 290 following uneven ground surface.

When the cultivator rig is raised to an inoperative position by rotating the rock shaft 295 and swinging the arm 296 upwardly, which exerts a pull through the chain 297 on the lower link 272 of the rig, the arm 312 swings with the shaft 295, which is in a counter clockwise direction as viewed in Figure 11. The arm 312 thus exerts a thrust on the link 311 which, acting through the arm 310 secured to the upper end of the spindle 265, immediately swings the cultivator tool beam 260 laterally from the position shown in Figure 10 adjacent or in front of the tractor wheel 5 to the position shown in Figure 12 laterally inwardly of the traction wheel.

Generically speaking, the laterally inward movement of the cultivator rig 250 occurs as the lifting mechanism is actuated to raise the rig vertically. Therefore, the rigs shown in Figures 10 to 13, like the rigs in the constructions described previously, move upwardly along a path which is, for the laterally outer rig, inclined upwardly and inwardly with respect to the tractor. However, in the specific construction shown in Figures 10 to 13, the laterally inward swinging movement of the rig 250 occurs immediately upon the actuation of the rock shaft 295, whereas, because of the slack in the chain 297, the lifting action is delayed to a certain extent. By virtue of this construction, the laterally outer and rear shovel 263 is swung inwardly from underneath the tractor wheel 5 before the lifting action begins to occur. It will be apparent, of course, that the relation between these two functions may be varied by varying the link 311 and the chain 297.

The construction of the laterally inner or companion cultivator rig for the outer rig illustrated in Figures 10 to 13 is practically identical with the construction of the rig described above, and hence the same has not been illustrated. About the only difference is that the beam 260 for the inner rig is bent laterally inwardly instead of outwardly and the arm 310 for the inner rig would extend inwardly, instead of outwardly as illustrated in Figure 10, so that when the rock shaft 295 is actuated the inner rig would swing outwardly as it is raised, rather than inwardly, as is the case of the outer rig 250. It will thus be observed that in the construction shown in Figures 10 to 13, the inner and outer rigs at each side of the tractor are shifted vertically in upwardly converging inclined planes or paths of movement. It is also important to note that in the construction shown in Figures 10 to 13, the variations of the rigs, either due to depth adjustment or to variations in the ground level, do not vary the lateral position of the rig beams. In the construction illustrated in these figures, this is because of the parallel link construction described above and because of the slack in the chain 297 permitting the rig to rise and fall without rocking the shaft 295.

In Figures 14 to 18, inclusive, the same principle of mounting the rig is employed as shown in the construction described above and illustrated in Figures 10 to 13, and like reference numerals have been used for parts which are identical or practically so. In this case, however, the control of the swinging movement of the rig beam differs in that it includes a connection with one of the parallel links, rather than through a separate control with the lifting rock shaft 295. This latter construction is especially adapted for rigs wherein the depth of operation is to be controlled to a connection with the lifting rock shaft 295, rather than through the provision of an independent gauge wheel, such as is indicated at 290 in Figures 10 to 13. It is to be understood, of course, that a gauge wheel 290 could be employed for the rigs shown in Figures 14 to 17, if desired.

Referring now more particularly to Figures 14 to 18, inclusive, it will be seen that the upper parallel link 311 is mounted with its laterally turned ends directed inwardly, rather than outwardly as in Figures 10 to 13. In both cases, however, the sleeve 266 and the associated tool beam 260 are constrained to move vertically in successively parallel position by virtue of the parallel links 270 and 311. The lower laterally bent end of the parallel link 311 is provided with a squared portion 330, best shown in Figure 18, and on this end an arm 331 is mounted and is provided with an eye 332 connected by means of a link 333 with the outer end of an arm 334 fixed to form a part of the upper end of the spindle 265 of the tool beam 260.

By virtue of the squared end 330 of the link 311 the arm 331 is constrained to move angularly with the upper parallel link. Hence the vertical movement of the rig 250 causes an angular movement of the link 311 with respect to the spindle 265, swinging with it the arm 331. The outer end 332, as will be obvious, moves toward and away from the axis of the spindle or sleeve 266 and thus exerts a force on the outer end of the arm 334 which swings the tool beam 260 in a lateral direction. For example, looking at Figures 14 and 15, when the rig is raised, as by rocking the shaft 295 and swinging the arm 296, the outer end of which is connected by an adjustable link 350 with the lower parallel link 270, the rig 250 will be raised and the upper parallel link 211 will be swung in a counter clockwise direction with respect to the sleeve 266 during this operation. This swings the arm 331 in the same direction in this figure, and the arm therefore exerts a thrust on the short link 33 and swings the arm 334 at the upper end of the spindle 265 in a counter clockwise direction as viewed in Figure 14, thereby swinging the rear shovel 263 inwardly of the tractor and out of the plane of the traction wheel 5. The shovel 263 is shifted inwardly an amount sufficient to clear the lugs on the wheel 5 and any soil adhering thereto, as will be clear from Figure 16. As will be obvious, the length of the arms 334 and 331 can be varied to govern the amount of lateral swinging of the tool beam 260 when it is raised to its inoperative position. Figures 16 and 17 show the beam 260 raised to its inoperative position in between the traction wheel 5 and the body 2 of the tractor.

The threaded link 350 is received within a trunnion at the outer end of the arm 296 and is provided with a crank portion 351 which may be rotated to vary the operating depth of the shovels 261, 262 and 263. When the rig 250 is in its working position, as best shown in Figure 15, it will be observed that the arms 331 and 333 lie substantially in the same plane alongside each other so that for a small angular movement of the arm 331 secured to or forming a part of the upper parallel link 311 substantially no angular movement is imparted to the arm 334 and the spindle 265 associated therewith. By virtue of this construction, therefore, the connection between the tool beam 260 and the parallel link 311 in the form of the invention shown in Figures 14 to 18, little or no lateral swinging of the rig takes place during the rocking movement of the lifting shaft throughout the range thereof which is operative to adjust the working depth of the shovels 261 to 263. That is, by virtue of the angular relations between the arms 331 and 333, rocking of the rock shaft 295 does not materially affect the lateral position of the beam 260 until the tips of the shovels have been raised above the ground surface. Continued rocking of the shaft 295 to raise the rigs further will then become effective to swing the tool beam laterally with respect to the tractor so as to clear the traction wheel 5. In the form of the invention shown in Figures 14 to 18, the threaded crank shaft 350—351 is utilized to secure the desired depth adjustment.

As in the case of the form of the invention shown in Figures 10 to 13, inclusive, the cultivator unit illustrated in Figures 14 to 18, inclusive, includes a companion rig which is practically identical with the rig just described, and hence the companion rig has not been illustrated. Like all of the forms of the invention disclosed above, there is preferably a cultivator unit at each side of the tractor, and each of the units includes a pair of cultivator rigs controlled according to the principles described above.

In case the rig shown in Figures 14 to 18 were provided with a caster wheel, the connection between the lifting arm 296 and the lower parallel link 270 could be effected by means of a chain, such as shown in Figure 11, as well as by the threaded link or crank arm 350 shown in Figure 15. In the form of the invention shown in Figures 14 to 18, it will also be observed that the cultivator construction contemplated includes at each side of the tractor a pair of cultivator rigs which are raised and lowered in planes or paths of movement which are inclined with respect to the tractor and converge upwardly so that the outer rigs clear the traction wheels and the inner rigs clear the body of the tractor when the rigs are raised to their inoperative position.

While I have described above the several constructions in which the principles of the present invention have preferably been embodied, it will be apparent to those skilled in the art that my invention is not to be limited to the specific means shown and described but that, in fact, widely different means may be employed in the practice of the broader aspects of my invention.

What I claim, therefore, and desire to secure by Letters Patent is:

1. A cultivator comprising a wheel supported frame, a pair of cultivating rigs movably supported at one side of said frame, and means for raising and lowering said rigs in upwardly converging paths, whereby said rigs approach each other as they are raised.

2. A cultivator comprising a wheel supported frame, a cultivating rig movably supported at one side of said frame, means pivotally connecting said rig to said frame and including means constraining the rig to shift simultaneously laterally and vertically whenever it is raised and lowered, and means for raising and lowering said rig.

3. A cultivator comprising a wheel supported frame, a pair of cultivating rigs movably supported at each side of the frame, means constraining the laterally outer rigs to shift laterally inward when raised, means constraining the laterally inner rigs to shift laterally outward when raised, and means for raising and lowering said rigs.

4. A cultivator comprising a wheeled supporting frame including laterally spaced parts, a tool carrying beam, means for raising said beam, and means pivotally connecting said beam with said frame, said connecting means including means for constraining the beam to shift laterally, simultaneously with its vertical movement, from one position adjacent one of said laterally spaced parts to another position between said parts whenever the rig is raised.

5. A motor cultivator comprising, in combination, a tractor having a longitudinally extending body and means for supporting the body including a steering truck at the front and a traction wheel at the rear spaced laterally from the body, a laterally extending support carried by the tractor ahead of the traction wheel, a ground working tool positioned to work the ground under the tractor body, a second tool positioned to work the ground in front of the traction wheel, and means connecting said tools with said support whereby the tools may be moved relative to the support in paths extending upwardly towards each other to an inoperative position outside of the outermost plane of the tractor body and inside of the innermost plane of the traction wheel.

6. A motor cultivator comprising, in combination, a tractor having a longitudinally extending body and means for supporting said body including a traction wheel spaced laterally from the body, a support carried by the tractor and extending laterally therefrom near the front end of the tractor, a pair of tool carrying beams positioned to cultivate the soil on opposite sides of a plant row, the inner beam carrying a tool positioned to cultivate the soil adjacent the tractor body and the outer beam carrying a tool positioned adjacent said traction wheel, means connecting said beams with said support for vertical movement in inclined upwardly converging planes, whereby when said beams are raised to inoperative position the tool on said inner beam will be moved outwardly to clear the tractor body and the tool on said outer beam will be moved inwardly within the innermost plane of the traction wheel, and means for raising said beams to inoperative position.

7. A motor cultivator comprising, in combination, a tractor having a longitudinally extending body and means for supporting said body including a steering truck at its front end and a traction wheel spaced laterally from the body, a support carried by the tractor and extending laterally therefrom near the front end of the tractor, a pair of rearwardly diverging tool carrying means positioned to cultivate the soil on opposite sides of a plant row, the inner beam carrying a tool positioned to cultivate the soil under the tractor body and the outer beam carrying a tool positioned directly in line with said traction wheel, means connecting said beams with said support for vertical movement in inclined upwardly converging planes, whereby when said beams are raised to inoperative position the tool on said inner beam will be moved outwardly to clear the tractor body and the tool on said outer beam will be moved inwardly within the innermost plane of the traction wheel, and means for raising said beams to inoperative position.

8. A cultivator comprising a frame, a tool carrying beam, and means pivotally connecting said beam with the frame for movement relative thereto about a relatively fixed pivot axis inclined with respect to the horizontal.

9. A cultivator comprising a frame, a tool carrying beam, and a pivot bolt fixedly supported on said frame in an inclined position in a transverse vertical plane for pivotally connecting said beam with said frame.

10. A cultivator comprising a wheel supported frame, a beam for supporting cultivating tools, a pair of parallel links, and pivot means connecting the ends of said links to said frame and to said beam, the axes of said pivots being inclined with respect to the horizontal and parallel to each other and extending transversely with respect to said frame.

11. A cultivator comprising a frame, a tool carrying beam, and a pair of parallel links disposed in a vertical plane connected to said frame for rotation with respect thereto about parallel inclined axes and to said beam for rotation with respect thereto about inclined axes parallel to each other and to said first inclined axes.

12. A cultivator comprising a frame, a laterally extending draft bar carried thereby, a tool carrying beam pivoted directly to said draft bar for swinging movement about a transversely extending pivot axis inclined with respect to said laterally extending draft bar, and means connected with said beam for swinging the same about its axis.

13. A cultivator comprising a frame, a tool carrying beam, means connecting said beam to said frame whereby said beam may be raised and lowered in a vertical plane with respect to the frame and may rotate in a horizontal plane with respect to said frame, and means for restraining said beam against such rotation when in operating position and for rotating the beam when it is raised to an inoperative position.

14. A cultivator comprising a frame, a tool carrying beam having a substantially vertical spindle at its forward end, a sleeve member in which said spindle is journaled, means connecting said sleeve member to said frame for vertical movement with respect to the frame, lifting means on the frame for raising said beam and sleeve member from an operative position to an inoperative position, and means for holding said spindle from rotating in said sleeve when said beam is in an operative position and for rotating the spindle in the sleeve when the beam is raised to an inoperative position to cause the beam to swing in a horizontal plane when lifted.

15. A cultivator comprising a wheel supported frame, a pair of cultivating rigs movably supported at one side of said frame, means connecting each of said rigs with the frame whereby each may be raised and lowered in a vertical plane with respect to the frame and may rotate in a horiozntal plane with respect to the frame, means for raising and lowering said rigs, and means for causing the laterally outer rig to move inwardly and the laterally inner rig to move outwardly when said rigs are raised.

16. A cultivator comprising a frame, a tool carrying beam, means connecting said beam to said frame whereby said beam may be raised and lowered in a vertical plane with respect to the frame and may rotate in a horizontal plane with respect to the frame, lifting means for raising said beam from a working position to an inoperative position, and means restraining said beam against rotating in a horizontal plane when in a working position, said restraining means being actuated by the operation of said lifting means to rotate said beam in a horizontal plane.

17. A cultivator comprising a frame, a tool carrying beam, means connecting said beam to said frame whereby said beam may be raised and lowered in a vertical plane with respect to the frame and may rotate in a horizontal plane with respect to the frame, lifting means for raising said beam from a working position to an inoperative position including a rock shaft, an arm on said rock shaft, an arm on said beam, and a link connecting said arms, whereby said beam is held against rotation when in operating position and is rotated by the rocking of said rock shaft when the beam is lifted.

18. A cultivator comprising a frame, a tool carrying beam having a substantially vertical spindle at its forward end, a sleeve member in which said spindle is journaled, a pair of parallel links connecting said sleeve member to said frame, whereby said sleeve, said spindle and said beam may move vertically as a unit with respect to the frame, lifting means for raising and lowering said unit, an arm on the rock shaft, an arm on said spindle, and a link connecting said arms, whereby said spindle is rotated in said sleeve when said unit is raised by the rocking of said rock shaft.

19. A cultivator comprising a frame, a tool carrying beam having a substantially vertical spindle at its forward end, a sleeve member in which said spindle is journaled, a pair of parallel links connecting said sleeve member to said frame, whereby said sleeve, said spindle and said beam may move vertically as a unit with respect to the frame, lifting means for raising and lowering said unit including a rock shaft and a lost motion connection between the rock shaft and said unit, gauge means for causing the beam to rise and fall in response to the unevenness of the ground being cultivated, an arm on said rock shaft, an arm on said spindle, and a link connecting said arms, said latter link being equal in length to and parallel with said pair of parallel links, whereby said spindle is held against rotation in said sleeve as said unit rises and falls when following the unevenness of the ground but is rotated in said sleeve when said unit is raised by the rocking of said shaft.

20. A cultivator comprising a frame, a tool carrying beam having a substantially vertical spindle at its forward end, a sleeve member in which said spindle is journaled, a pair of parallel links connecting said sleeve member to said frame, whereby said sleeve, said spindle and said beam may move vertically as a unit with respect to the frame, an arm on one of said parallel links, an arm on said spindle, and a link connecting said arms, whereby when said unit is raised with respect to the frame said spindle is rotated in said sleeve.

21. A cultivator comprising a wheel supported frame, a pair of cultivating units movably supported at one side of said frame, means connecting said units with said frame and constraining the outer unit to move in a path which extends upwardly and laterally inwardly with respect to said frame, and means for raising and lowering both of said units.

22. A cultivator comprising a wheel supported frame, a pair of cultivating rigs movably supported at one side of said frame, means connecting each of said rigs with the frame for movement about substantially horizontal axes, whereby each may be raised and lowered in a vertical plane with respect to the frame, said connecting means also including means defining substantially vertical axes for the rigs, whereby each may rotate in a horizontal plane with respect to the frame, means for raising and lowering said rigs, and means reacting against said rigs whereby the laterally outer rig moves inwardly and the laterally inner rig moves outwardly when said rigs are raised.

23. A cultivator comprising a frame, a tool carrying beam having a substantially vertical spindle at its forward end, a sleeve member in which said spindle is journaled, means connecting said sleeve member with the frame for relative vertical movement, means including a member swingable in a vertical plane as said sleeve member is moved vertically, and means connecting said swingable member and said beam whereby when the latter is raised the beam is caused to rotate relative to said sleeve member.

THEOPHILUS BROWN.